United States Patent [19]
Kanehira et al.

[11] 3,880,148
[45] Apr. 29, 1975

[54] ENDOSCOPE

[75] Inventors: Katsuyuki Kanehira; Nobuo Yamashita, both of Tokyo, Japan

[73] Assignee: Olympus Optical Co., Ltd., Tokyo, Japan

[22] Filed: Sept. 24, 1973

[21] Appl. No.: 400,195

[30] Foreign Application Priority Data
Sept. 25, 1972 Japan................................ 47-95935
Sept. 25, 1972 Japan................................ 47-95936
Sept. 25, 1972 Japan................................ 47-95937
Sept. 12, 1973 Japan................................ 48-102202

[52] U.S. Cl. .................................................. 128/6
[51] Int. Cl. .................................................. A61b 1/06
[58] Field of Search ........................... 128/4, 6, 7, 8

[56] References Cited
UNITED STATES PATENTS
2,987,960  6/1961  Sheldon ............................. 128/6 X
3,096,756  7/1963  Rosenfeld et al. ..................... 128/6
3,256,875  6/1966  Tsepelev et al. ....................... 128/8
3,548,808  12/1970 Takahashi et al. ..................... 128/6

Primary Examiner—Lucie H. Laudenslager
Attorney, Agent, or Firm—Cushman, Darby & Cushman

[57] ABSTRACT

An endoscope arranged so that the observing direction can be continuously changed in an extremely wide range by providing two reflecting elements at the end on the object side of the image guide comprising an optical fiber and by rotating one of said reflecting elements.

13 Claims, 13 Drawing Figures

ENDOSCOPE

BACKGROUND OF THE INVENTION a. Field of the Invention

The present invention relates to an endoscope having a flexible optical fiber and used for observation of the inside of body cavities or of pipes and tubes in industrial fields.

b. Description of the Prior Art

Endoscopes now available for medical purposes for observing the inside of a stomach, esophagus, etc. can be classified into two typical types. One is the forward-viewing type for observation along the axis of the distal end of the endoscope and the other is the side-viewing type for observation in one direction which is at a right angle to the axis of the distal end. These two types have advantages and disadvantages respectively. For example, in a narrow tubular portion such as the esophagus, it is sometimes very difficult to use the side-viewing type endoscope because the sight for observation is narrow and, moreover, it is difficult to provide a sufficient optical length between the lens and object. By the forward-viewing type endoscope, it is possible to observe from comparatively distant positions to near portions. Therefore, in such narrow tubular portions, forward-viewing type endoscopes are generally used. On the other hand, in a wide bag-like cavity such as a stomach, side-viewing type endoscopes are generally used because it is possible to observe all over the side walls. For such reasons, the side-viewing type endoscope and forward-viewing type endoscope are used for different applications according to the characteristics of the portion to be observed so that their advantages can be fully utilized. For example, however, when it is required to observe the esophagus and stomach of one patient at the same time, it is necessary to use two endoscopes for the above reason. That is, the forward-viewing type endoscope is inserted for observing the esophagus at first and, after that, it is pulled out and the side-viewing type endoscope is inserted for observing the stomach. So, it takes a long time for observation. Moreover, as it is widely known, pain of the patient is extremely large when the hard distal end of the endoscope passes his throat. Therefore, it is not desirable to insert two different endoscopes successively because pain of the patient will be further increased.

Under such circumstances, there have been a strong demand for such an endoscope which enables to observe in a wide range combining sideviewing and forward viewing at the same time. But, an endoscope to fulfil such demand has not yet been materialized.

SUMMARY OF THE INVENTION

It is, therefore, the principal object of the present invention to provide an endoscope capable of changing the observing direction continuously by providing a reflecting member rotatably mounted at the end on the object side of the optical observation system.

Another object of the present invention is to provide an endoscope capable of continuously changing the observing direction providing a rotatable reflecting members at the end on the object side of the optical illuminating system besides said reflecting member for the optical observation system so that both reflecting members can be rotated integrally.

Still another object of the present invention is to provide an endoscope capable of continuously changing the observing direction and provided with a compensating means for image rotation, which changes according to rotation of the reflecting member, provided at the end on the object side of the optical observation system.

Further objects of the present invention will become evident by detailed description of embodiments below referring to accompanying drawings.

BRIEF DESCRIPTION OF DRAWINGS

Flg. 7 shows another compensating means for said image rotation.

DETAILED DESCRIPTION OF THE PREFERRED EMBODIMENTS

Figure 1:
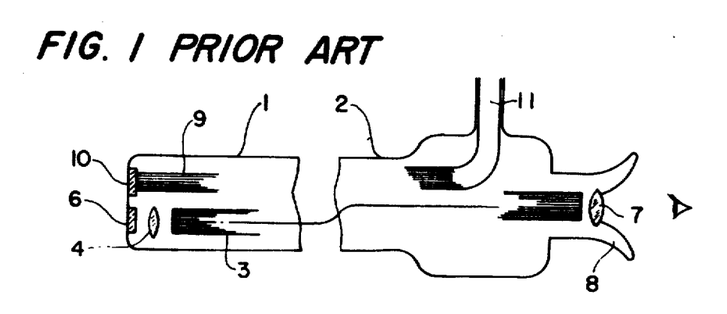
FIG. 1 shows a sectional view of a conventional forward-viewing type endoscope.
Figures 2, 3, 4, 5:
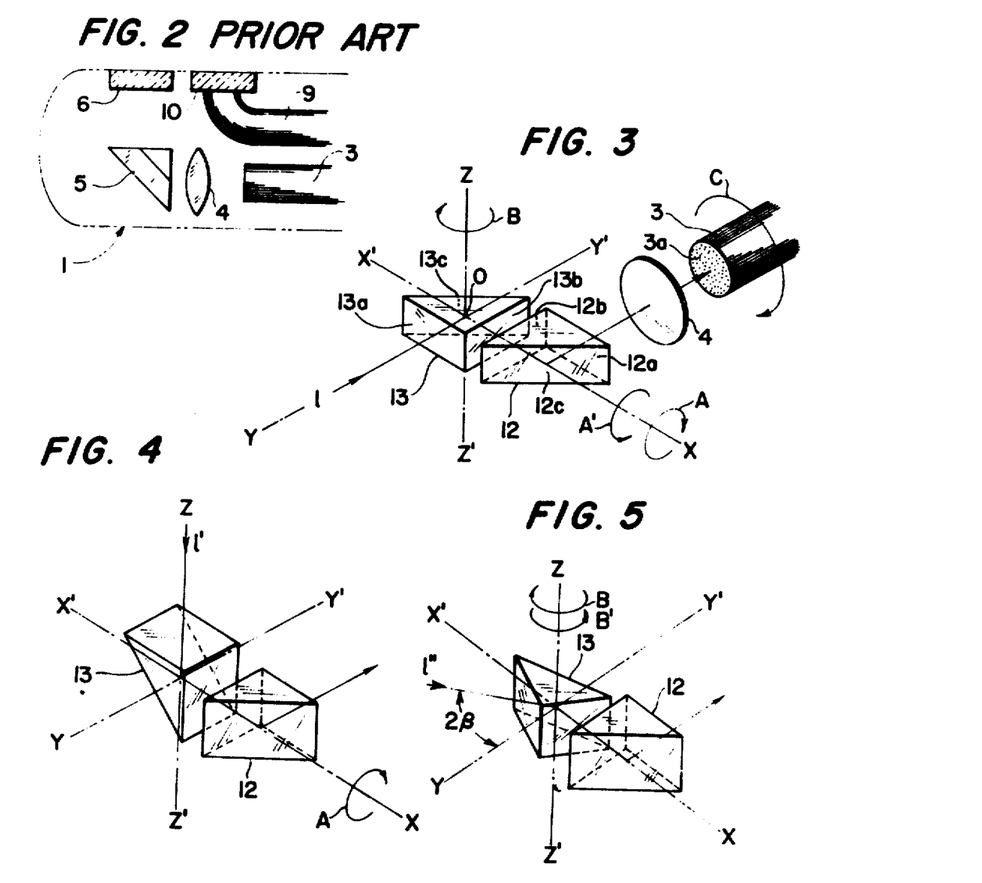
FIG. 2 shows a sectional view of a conventional side-viewing type endoscope.
FIG. 3 shows an enlarged view of the optical system at the distal end of en embodiment of the present invention.
FIG. 4 illustrates the case where the observing direction is changed upward in said embodiment of the present invention.
FIG. 5 illustrates the case where the observing direction is changed rightward in said embodiment of the present invention.

Referring to drawings, FIG. 1 shows an example of conventional forward-viewing type endoscopes used at present and FIG. 2 shows an example of conventional side-viewing type endoscopes. In these figures, numeral 1 designates a hard distal end of the endoscope, numeral 2 designates a control unit, numeral 3 designates an image guide comprising optical fiber, numeral 4 designates an objective, numeral 5 designates a roof prism (refer to FIG. 2), numeral 6 designates a cover glass of the optical observation system, numeral 7 designates an eyepiece, numeral 8 designates an eyepiece lens mount, numeral 9 designates a light guide comprising optical fiber, numeral 10 designates a cover glass of the illuminating system and numeral 11 designates a universal cord for the light guide for transmitting the illuminating light being connected to a light source at the outside.

FIG. 3 shows an optical system of the observation system at the distal end of the endoscope according to the present invention. In this system, a first isosceles right triangular prism 12 and second isosceles right triangular prism 13 are provided at the end on the object side of the image guide 3 and objective 4. Out of those prisms, the first isosceles right triangular prism 12 is positioned with its surface 12a facing the objective 4. The second isosceles right triangular prism 13 is positioned with its surface 13a facing the object and another surface 13b facing the surface 12b of the first isosceles right triangular prism 12. The first isosceles right triangular prism 12 is fixed at said position but the second isosceles right triangular prism 13 is rotatably arranged as described in detail in the following.

When the surface 13b of the second prism 13 is positioned in parallel with the surface 12b of the first prism 12 as shown in FIG. 3, the following coordinate system can be considered. That is, the center O of the surface 13c of the second prism 13 is the origin, the line vertical to the surface 12b of the first prism 12 and to the surface 13b of the second prism 13 is the X axis, the line perpendicular to said X axis and vertical to the surface 13a of the second prism 13 is the Y axis and the line perpendicular to said X and Y axes is the Z axis. In this coordinate system, the light 1 from the object along the Y axis at first comes into the second prism 13 through the surface 13a of the second prism 13, is totally reflected on the surface 13c and goes out through the surface 13b in the direction vertical to the surface 13b, i.e., in the direction of the X axis. Then, said light enters the first prism 12 through the surface 12b, totally reflected on the surface 12c and goes out through the surface 12a being directed toward the objective 4. This light then forms an image of the object on the end face 3a of the image guide 3 by means of the objective 4. This image is transmitted, as known widely, by the image guide 3 to the other end of the image guide 3 and is observed through the eyepiece 7.

Now, let us consider the case where the second prism 13 is turned 90° in the direction shown by the arrowhead A around the X axis so that the surface 13a faces in the Z direction of the Z axis (see FIG. 4). In this case, the object in the Y direction cannot be observed but the object in the Z direction, i.e., in the above in said FIGURE, can be observed. That is, the light 1' from the direction along the Z axis is totally reflected on the surface 13c of the second prism 13 to change its advancing direction into the direction along the X axis and forms an image of the object on the end face 3a of the image guide 3 by means of the objective 4 passing through the optical path as described in the above. On the contrary, when the second prism 13 is turned 90° in the direction shown by the arrowhead A', which is opposite to that shown by the arrowhead A, around the X axis from the position shown in FIG. 3 so that the surface 13a faces toward the Z' direction, the light from the object in the Z' direction, i.e., from below in said figure, forms an image on the end face 3a of the image guide 3 by means of the objective 4 in the same way as described in the above and is observed.

In the above description, cases to observe only in directions Z and Z' are mentioned. However, the observing direction is not limited to the above but it is possible to observe in any desired angular direction from the Z direction through Z' direction. Moreover, when the rotating direction is changed continuously, it is possible to observe the object by continuously changing the observing direction in turn. Besides, the range of observing direction is not limited to the range between the Z direction and Z' direction which are 90° each upward and downward in respect to the Y directions of larger angles than the above.

In the explanation so far, the case where the second prism 13 is turned around the X axis has been taken up. But, it is also possible to turn the second prism 13 around the Z axis. When the second prism 13 is turned by the angle β around the Z axis in the direction shown by the arrowhead B, the surface 13a of the second prism 13 faces in the direction shifted rightward from the Y axis by the angle β (see FIG. 5). As a result, the light 1'' from the object in the direction of angle 2β comes into the second prism 13 through the surface 13a, is totally reflected by the surface 13c to change the advancing direction to the X direction, thus forms an image of the object on the end face 3a of the image guide 3 by means of the objective 4. When the second prism 13 is turned around the Z axis toward the opposite direction, i.e., in the direction shown by the arrowhead B', by the angle β, it is possible to observe the object in the direction shifted leftward by the angle 2β in respect to the Y axis. By this rotation around the Z axis, it is possible to observe the object by continuously changing the observing direction between the angle +β and angle −β (when the clockwise rotation is shown by + and the counterclockwise rotation is shown by −). In other words, it is possible to observe by continuously changing the observing direction rightward and leftward.

When the observing direction is changed in both upward and downward direction and rightward and leftward direction at the same time, it is possible to observe continuously in a wide range in both upward and downward direction and rightward and leftward direction.

In case of upward and downward changing, i.e., rotation around the X axis, the observing direction can be changed more than 90° both upward and downward. For rightward and leftward change, i.e., rotation around the Z axis, the rotating angle is limited to a comparatively small amount for both directions. In case of rightward and leftward change, the image does not cause rotation. But, in case of changing the observing direction upward and downward, the image also rotates. Therefore, it is somewhat inconvenient for observation by continuously changing the observing direction upward and downward.

Figure 6:
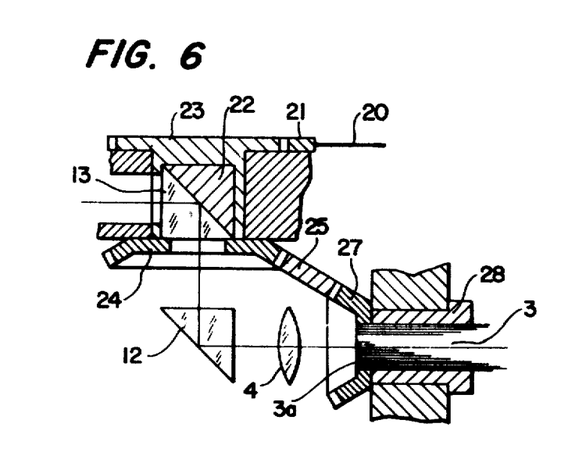
FIG. 6 shows an example of compensating means for image rotation which occurs when the observing direction is changed upward and downward in said embodiment of the present invention.

To eliminate the above disadvantage, rotation of the image can be compensated by the means as described below. The first means is to rotate one of end portions of the image guide 3 according to rotation of the second prism 13. That is, when the second prism 13 is turned in the direction shown by the arrowhead A in FIG. 3, the image guide 3 may be also turned in the direction shown by the arrowhead C at the same time. Thus, it is possible to observe the image being free from image rotation. In this case, the end portion of the image guide can be turned either on the objective side or eyepiece side, but the turning direction becomes opposite to each other. An example of said compensation mechanism is shown in FIG. 6. That is, when the wire 20 is moved rightward or leftward in said figure by operating the control unit 2, the rack 21 attached at the end of the wire 20 moves. So, the gear 23 which meshes with the rack 21 and is mounted to the holding base 22, to which the second prism 13 is fixed, is rotated. Besides, through the bevel gear 24 mounted to the other side of the holding base 22 and the gear 25 meshing with said bevel gear 24, another bevel gear 27 is rotated and, consequently, the holding tube 28 which holds the image guide 3 is also rotated. Therefore, the second prism 13 fixed to the holding base 22 and image guide 3 held by the holding tube 28 rotate at the same time.

Figure 7:
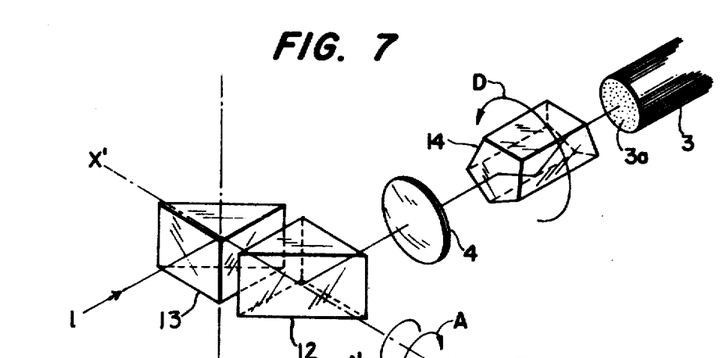

The second means to compensate the image rotation caused by rotation of the second prism 13 is an optical system arranging a roof prism 14 between the image guide 3 and objective 4 (or between the image guide 3 and eyepiece 7) as shown in FIG. 7. In case of this example, the image rotation can be eliminated by turning the roof prism 14 in the direction shown by the arrowhead D by a half of the angle a with which the second prism 13 is turned around the X axis in the direction shown by the arrowhead A, i.e., by turning the roof prism by $\alpha/2$.

In the above, only the optical observation system has been described. But, the same thing can be done also for the optical illuminating system. That is, in the optical system shown in FIG. 1, two isosceles right angular prisms can be arranged at the end on the object side of the light guide in the same way as the case of the optical observation system and the isosceles right angular prism on the object side may be rotated. In case of the optical illuminating system, it is not necessary to take the image rotation into consideration and, therefore, the compensating means is not required.

Figure 8:
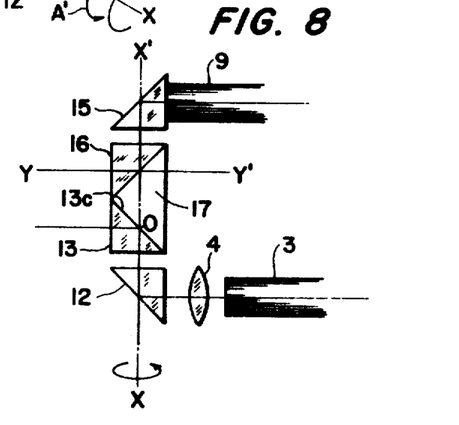
FIG. 8 shows a sectional view of another embodiment of the endoscope according to the present invention.

FIG. 8 shows an embodiment of the endoscope according to the present invention having the optical observation system and optical illuminating system. In this embodiment, a third isosceles right triangular prism 15 and fourth isosceles right triangular prism 16 are provided at the end on the object side of the light guide 9 of the optical illuminating system. The fourth prism 16 is integrally fixed to the base 17 together with the second prism 13 of the optical observation system. When the coordinate system is selected that the center O of the surface 13c of the second prism 13 is the origin, the line which passes said origin O and is vertical to the surface 13b is the X axis, the line which passes through said origin O and is in parallel with the observing direction is the Y axis, and the line perpendicular to said X and Y axes is the Z axis, it is possible to illuminate in any desired observing direction and to observe in said desired direction by integrally rotating the second and fourth prisms 13 and 16 around the X and Z axes in the same way as the afore-mentioned embodiment. Also in case of this embodiment, it is possible to observe by continuously changing the observing direction. In this embodiment shown in FIG. 8, the origin O is selected as the center of the surface 13c of the second prism 13. However, it is also possible to select the origin at other points, for example, the middle point of the line connecting the center of said surface 13c and center of the surface 16c of the fourth prism 16. In case of this embodiment, the problems of image rotation also occurs when the observing direction is changed upward or downward. For its compensation, all of the afore-mentioned compensation means for image rotation can be applied as they are also for this embodiment.

Figure 9:
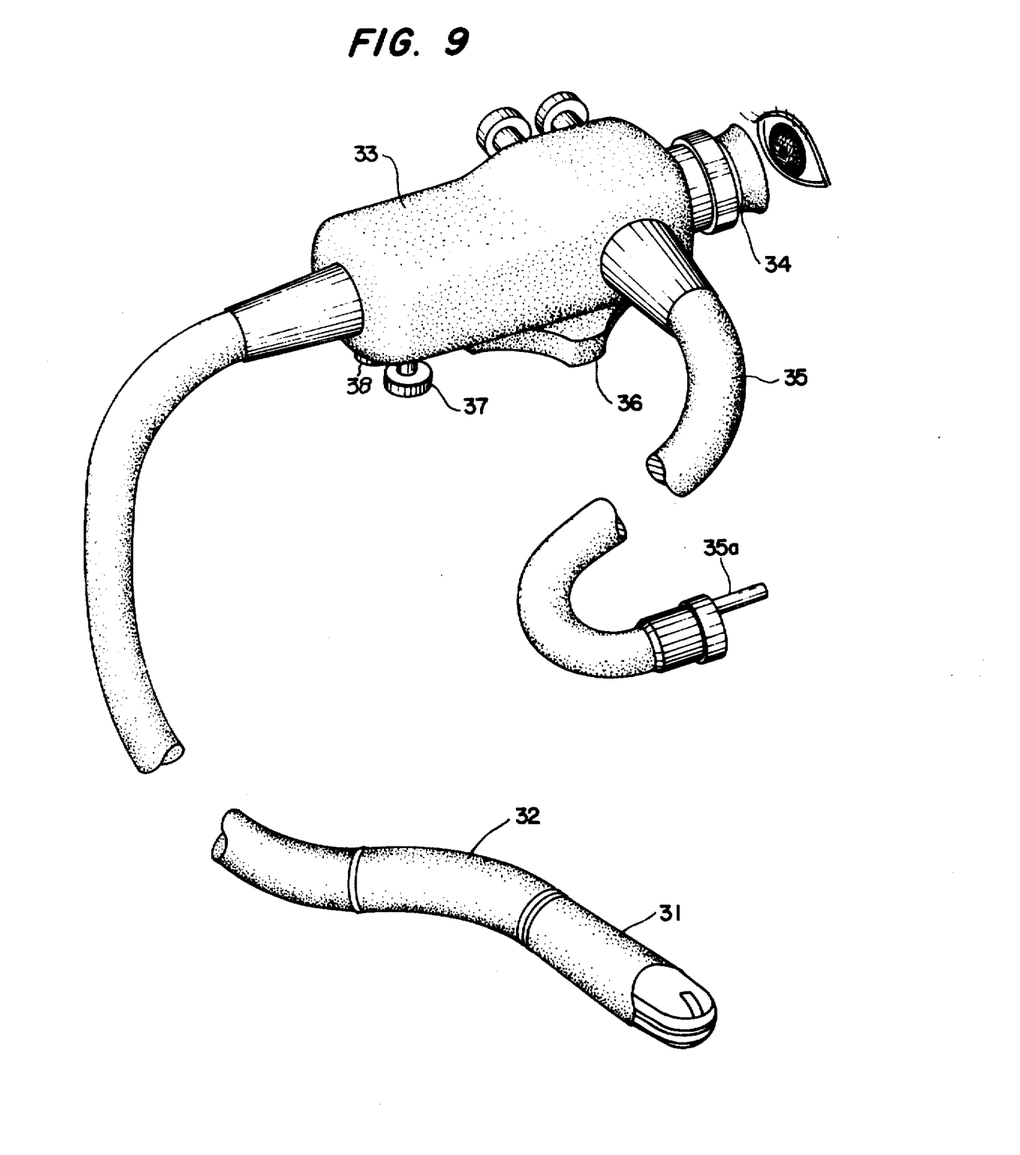
FIG. 9 shows an external view of the endoscope according to the present invention.
Figure 10:
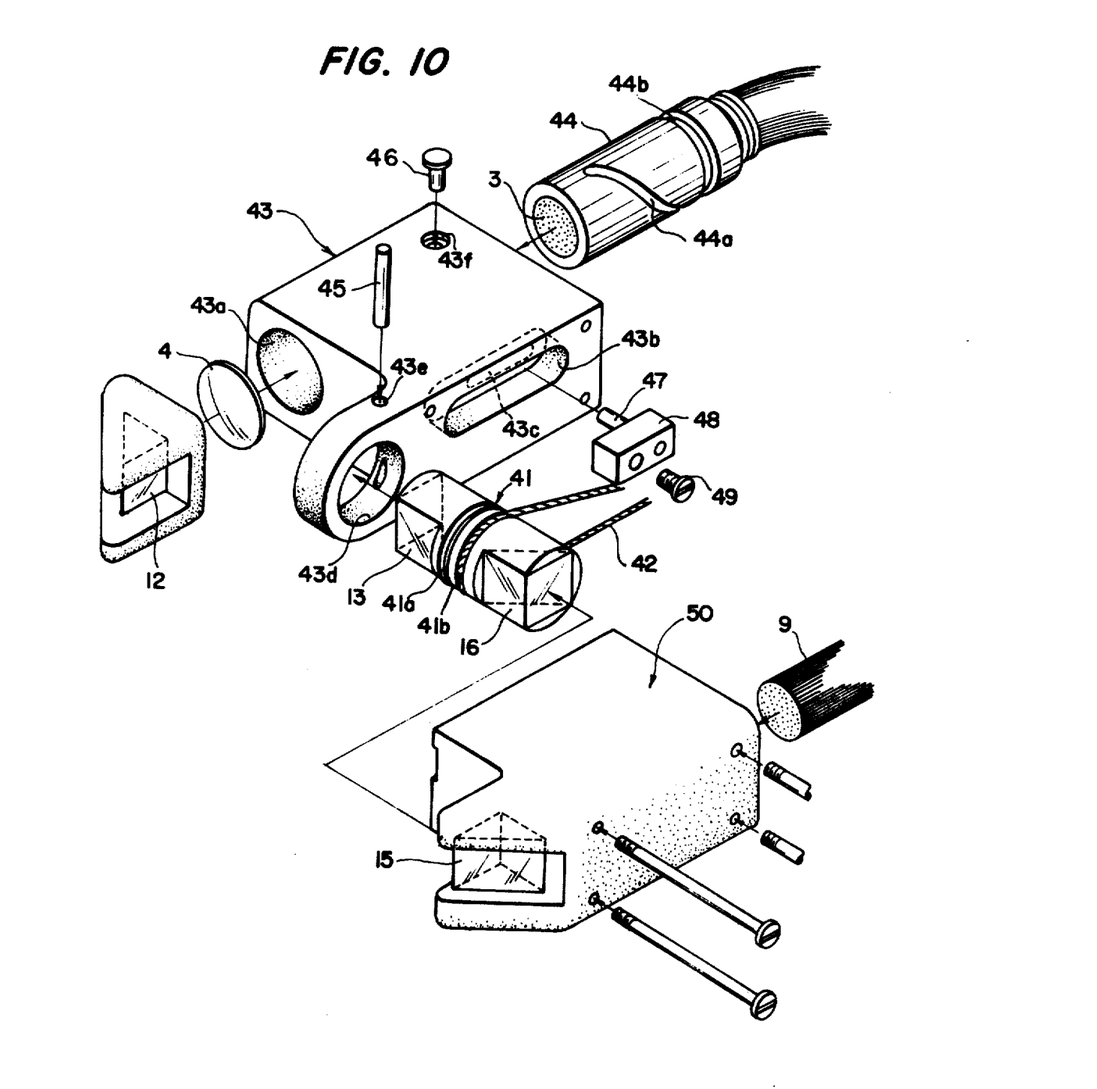
FIGS. 10 through 13 show exploded views of means for changing the observing direction of the endoscope according to the present invention.
Figure 11:
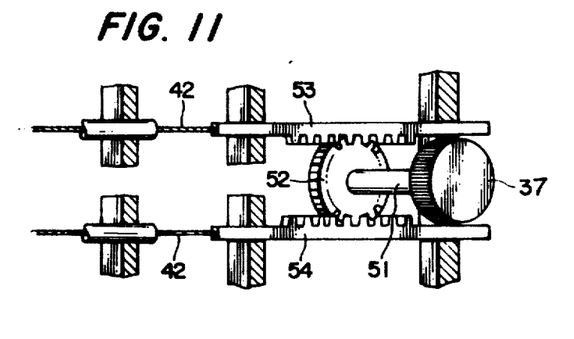

FIGS. 9 through FIG. 13 show the overall arrangements of the endoscope according to the present invention including the mechanism for integrally rotating the second and fourth prisms 13 and 16 in this embodiment in which the observing direction and illuminating direction are continuously changed at the same time. FIG. 9 shows the external view of the endoscope according to the second embodiment of the present invention. In this figure, numeral 31 designates a hard distal end, numeral 32 designates a bending section, numeral 33 designates a control unit, numeral 34 designates an eyepiece, and numeral 35 designates a universal cord having a connector 35a at its free end for connecting to the light source. Numeral 36 designates an angle knob for changing the direction of the distal end of the endoscope, numeral 37 designates an observing direction change knob for upward and downward direction, and numeral 38 designates an observing direction change knob for rightward and leftward direction. As to be described in detail in the following, it is so arranged that the second prism 13 and fourth prism 16 can be integrally rotated by said knobs 37 and 38. FIG. 10 shows an exploded view illustrating the detail of the inside of the distal end 31. In this figure, numeral 41 designates a cylindrical member for holding the second prism 13 and fourth prism 16. On the outer surface of said cylindrical member 41, a key way 41a and a groove 41b are formed. Numeral 42 designates a wire applied to the groove 41b which is fixed to the cylindrical member 41 at a pre-determined portion. Numeral 43 designates a case for housing the end portion of the image guide 3 on the object side which has a cylindrical hole 43a for inserting the image guide 3 and objective 4, a long narrow cavity 43b, a slot 43c which reaches the cylindrical hole 43a and an annular portion 43d for rotatably supporting the cylindrical member 41. To this case 43, the first prism 12 is fixed. Numeral 44 designates a holding tube for holding the image guide 3 having a cam groove 44a and key 44b on its outer surface. Numeral 45 designates a key to be inserted into the key way 41a through the hole 43e after inserting the cylindrical member 41 into the annular portion 43d. Numeral 46 designates another key to be inserted into the key way 44b through the hole 43f after inserting the holding tube 44 into the cylindrical hole 43a. Numeral 47 designates a cam pin fixed to the sliding member 48 and to be inserted into the cavity 43b together with said sliding member 48. In this case, the cam pin 47 is inserted into the cam groove 44a through the slot 43c. To this sliding member 48, a wire 42 is fixed by the wire fixing screw 49. Numeral 50 designates a case for housing the end portion of the light guide 9 on the object side. At one end of said case 50, a third prism 15 is fixed. The case 50 is to be fixed to the case 43 by a screw or the like. FIG. 11 shows the inside of the control unit 33 and especially shows the mechanism related with operation for integrally rotating the second prism 13 and fourth prism 16. In this figure, numeral 51 designates a shaft to which the knob 37 is fixed on one end and a pinion 52 is fixed on the other end. Numerals 53 and 54 designates racks respectively meshing with the pinion 52 and movable in directions opposite to each other by rotation of the pinion 52. At one end of each of said racks 53 and 54, each end of the wire 42 is fixed. Because of the above-mentioned arrangement, racks 53 and 54 move in the direction opposite to each other, when the observing direction change knob 37 is rotated, by rotation of the pinion 52. By said movement of those racks, the wire 42 fixed to those racks also move, thus the second prism 13 and fourth prism 16 are integrally rotated together with the cylindrical member 41. By movement of the wire 42, the sliding member 48 also moves in the cavity 43b and the cam pin 47 fixed to said sliding member 48 also moves along the slot 43c. By this movement of the cam pin 47, the holding tube 44 rotates together with the image guide 3. In other words, by rotation of the observing direction change knob 37, the second prism 13 and fourth prism 16 are rotated integrally and, consequently, the observing direction continuously changes upward and downward and image rotation is compensated at the same time by simultaneous rotation of the end portion of the image guide 3.

The embodiment described in the above is provided with a rotating mechanism for isosceles right triangular prisms which has a compensation mechanism for image rotation by rotating the end portion of the image guide on the object side.

Figure 12:
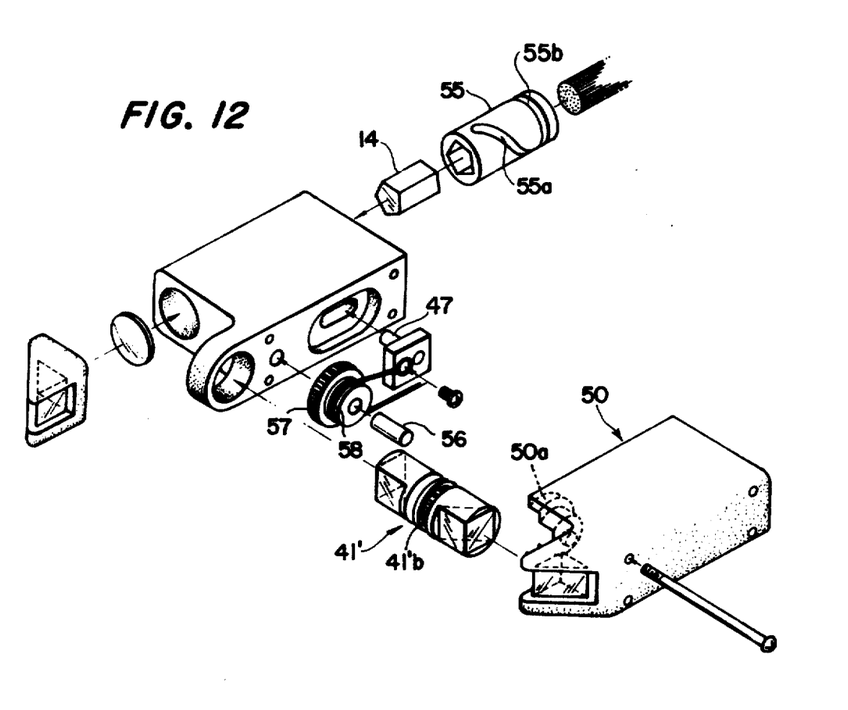

On the other hand, FIG. 12 shows another embodiment of a rotating mechanism for isosceles right triangular prisms which has a compensation mechanism for image rotation by rotating the roof prism. In this embodiment, a roof prism 14 is arranged between the image guide 3 and objective 4 of the aforementioned embodiment shown in FIG. 10, and said roof prism 14 is held by a holding tube 55 which has a cam groove 55a and key way 55b on its outer surface. Besides, the cylindrical member 41 holding the second right triangular prism 13 and fourth right triangular prism 16 in the aforementioned embodiment, is altered as designated by numeral 41'. That is, a gear 41'b is formed on its outer surface instead of the groove 41b in which the wire 42 was applied. Said gear 41'b meshes with another gear 57 rotatably mounted to a shaft 56. The number of teeth of said gear 57 is just twice the number of teeth of said gear 41'b. On said shaft 56, a pulley 58 is mounted so that it can be rotated integrally with said gear 57. On the pulley 58, the wire 42 is applied and is fixed to the pulley 58 at one pre-determined portion. The cavity 50a provided to the case 50 is to house the gear 57 etc. The other construction and arrangement are almost same as those of the embodiment shown in FIG. 10. Because of the above-mentioned construction, the wire 42 moves when the observing direction change knob 37 is rotated and the pulley 58 rotates by this wire movement, and gear 57 and 41'b rotate the cylindrical member 41'. Consequently, the right triangular prism 13 and right triangular prism 16 are turned upward and downward. At the same time, the sliding member 48 fixed to the wire 42 also moves and the holding tube 55 is rotated together with the roof prism 14 by means of the cam pin 47 and cam groove 55a. As the number of teeth of the gear 57 is twice the number of teeth of the gear 41'b in this case, the right triangular prisms 13 and 16 are turned by twice the rotational angle of the roof prism 14.

Figure 13:
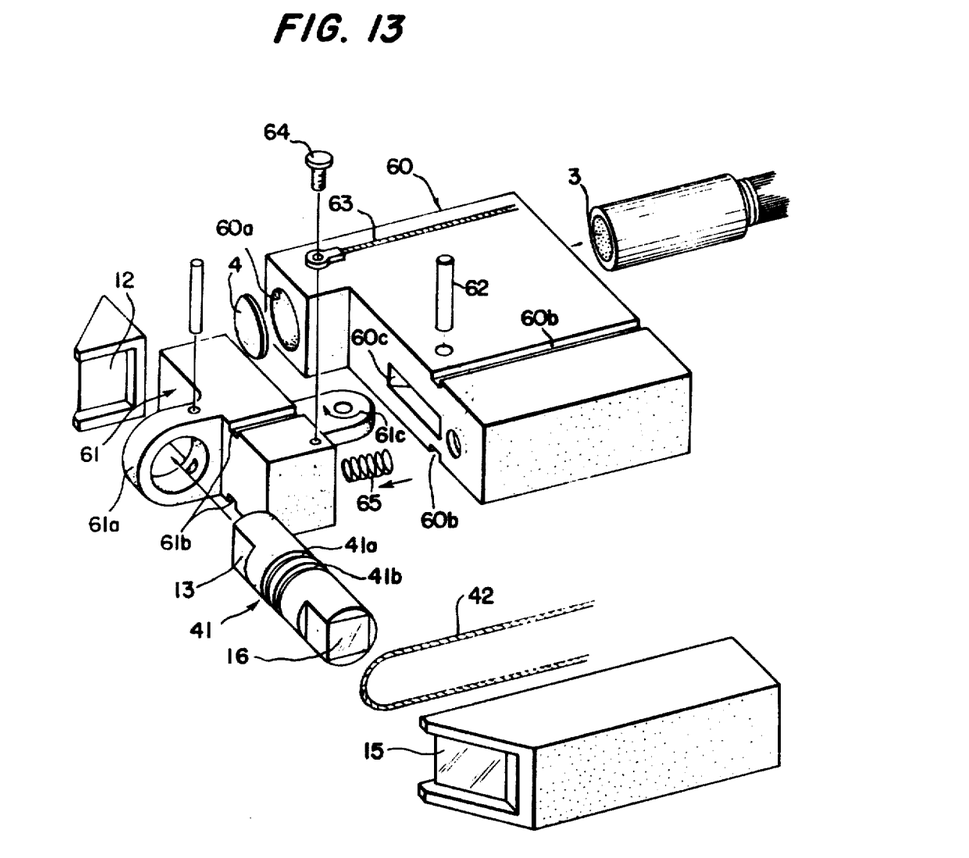

Now, a mechanism for changing the observing direction not only in upward and downward direction but also in rightward and leftward direction is described in the following. In FIG. 13, numeral 60 designates a case for housing the end portion on the object side of the image guide 3 having a cylindrical hole 60a for inserting the image guide 3, a groove 60b which serves as a wire guide, a cavity 60c for rotatably mounting a supporting member 61 and so forth. The supporting member 61 has an annular portion 61a for supporting the cylindrical member 41, a groove 61b which serves as a wire guide and a protuberance 61c. The supporting member 61 is pivotably mounted to the case 60 by inserting said protuberance 61c into the cavity 60c of the case 60 and by using a pin 62. Numeral 63 designates a wire for changing the observing direction rightward and leftward. One end of the wire 63 is fixed to the supporting member 61 by a screw 64 and the other end is connected to the observing direction change knob for rightward and leftward direction. Numeral 65 designates an compression spring mounted between the case 60 and supporting member 61 which urges the supporting member 61 always in the direction shown by an arrowhead. Therefore, when the wires 63 is pulled by operating the observing direction change knob for rightward and leftward direction, the supporting member 61 is turned in the direction opposite to the arrowhead moving against the force of the spring 65. When the wire 63 is released, the supporting member is rotated in the direction shown by the arrowhead by the force of the spring 65. In other words, the supporting member 61 can be turned rightward and leftward by operation of the wire 63 and, consequently, the cylindrical member 41 mounted to said supporting member 61 is also turned rightward and leftward. Upward and downward rotation can be achieved by the wire 42 in the same way as the above-mentioned embodiment. As the other parts are almost same as those of the embodiments shown in FIG. 10 and FIG. 12, detailed description is omitted here. In the above embodiments shown in FIG. 10, FIG. 12 and FIG. 13, arrangement of the optical system comprising isosceles right triangular prisms, objective, etc. is of course same as the arrangement already described on the optical system.

As described in detail in the above, the endoscope according to the present invention enables, by rotating the isosceles right triangular prisms provided at the end on the object side, to observe not only in the forward-viewing direction, i.e., in the direction along the axis of the endoscope, and in the side-viewing direction, i.e., in the direction at a right angle to the axis of the endoscope, but also to observe in a still wider range.

Besides, isosceles right triangular prisms employed in the above-mentioned embodiments can be replaced with other optical reflecting elements such as reflecting mirrors.

Furthermore, the endoscope according to the present invention is not limited to the above-mentioned embodiments but also permits various other arrangements. For example, it may be arranged to adopt only the optical illuminating system provided with a rotatable isosceles right triangular prism at the end on the object side for changing the illuminating direction by rotating said isosceles right triangular prism and to combine said optical illuminating system with an optical observation system having a wide-angle objective. Of course it is possible to arrange various such alternative or combined embodiments within the range of the present invention.

What is claimed is:

1. An endoscope comprising a first optical fiber element for transmitting an image of an object, an objective arranged at one end of said first optical fiber element for forming the image of the object, a first reflecting element arranged in front of said objective for deflecting the light from said object, a second reflecting element arranged for deflecting the light from the object toward said first reflecting element, and a means for rotating said second reflecting element upward and downward around an axis along an optical path between said first and second reflecting elements.

2. An endoscope according to the claim 1 further comprising a compensation means for image rotation arranged to rotate one of the ends of said first optical fiber element together with rotation of said second reflecting element.

3. An endoscope according to the claim 1 further comprising an image rotator arranged at one of the ends of said first optical fiber element and rotatable together with said second optical reflecting element.

4. An endoscope according to the claim 1 further comprising a means for rotating said second reflecting element in rightward and leftward direction.

5. An endoscope according to the claim 1 further comprising a second optical fiber element for illumination arranged in parallel with said first optical fiber element, a third reflecting element arranged near the end portion on the object side of said second optical fiber element for the purpose of deflecting the illuminating light transmitted by said second optical fiber element, and a fourth reflecting element arranged to deflect the illuminating light deflected toward said object and rotatable in upward and downward direction integrally with said second reflecting element.

6. An endoscope according to the claim 5 further comprising a compensation means for image rotation arranged to rotate one of the ends of said first optical fiber element at the same time when said second reflecting element and said fourth reflecting element are integrally rotated in upward and downward direction.

7. An endoscope according to the claim 6 wherein said compensation means for image rotation is an image rotator arranged at either end of said first optical fiber element, said image rotator being rotatable at the same time when said second reflecting element and fourth reflecting element are rotated integrally.

8. An endoscope comprising a first optical fiber element, an objective arranged to form an image of an object on one end of said first optical fiber element, a second optical fiber element for transmitting an illuminating light arranged in parallel with said first optical fiber element, a first reflecting element arranged in front of said objective in order to deflect the light from said object, a second reflecting element for deflecting the light from said object toward said first reflecting element, a third reflecting element arranged near the end on the object side of said second optical fiber element in order to deflect said illuminating light, a fourth reflecting element arranged to further deflect said illuminating light toward said object, and a means for rotating said fourth reflecting element in rightward and leftward direction integrally with said second reflecting element.

9. An endoscope according to the claim 8 further comprising a compensation means for image rotation for rotating either end portion of said first optical fiber element at the same time when said second reflecting element and fourth reflecting element are integrally rotated.

10. An endoscope according to the claim 9 wherein said compensation means for image rotation is an image rotator arranged at either end of said first optical fiber element, said image rotator being rotatable at the same time when said second reflecting element and fourth reflecting element are rotated integrally.

11. An endoscope comprising a first optical fiber element for transmitting an image of an object, an objective arranged at one end of said first optical fiber element for forming the image of the object, a second optical fiber element for illumination arranged in parallel with said first optical fiber element, a first reflecting element arranged in front of said objective for deflecting the light from said object, a second reflecting element arranged for deflecting the light from the object toward said first reflecting element, a third reflecting element arranged at the end portion on the object side of said second optical fiber element for the purpose of deflecting the illuminating light transmitted by said second optical fiber element, a fourth reflecting element arranged to further deflect the illuminating light deflected toward said object, a holding tube with a cam groove for holding an end portion on the object side of said first optical fiber element, a cylindrical member for holding said second reflecting element and said fourth reflecting element, a first case having a cylindrical hole for housing said holding tube and said objective, said first case further having an annular portion for rotatably holding said cylindrical member and having a slot formed in parallel with the axis of said cylindrical hole, a wire applied to said cylindrical member, a pin fixed to said wire and arranged to be inserted through said slot into said cam groove, and a second case mounted to said first case and housing the end portion on the object side of said second optical fiber element, said third reflecting element being fixed to said second case, whereby said cylindrical member and said holding tube are rotated at the same time by operation of said wire.

12. An endoscope comprising a first optical fiber element for transmitting an image of an object, an objective arranged at one end of said first optical fiber element for forming the image of the object, an image rotator arranged on the objective side of said first optical fiber element, a second optical fiber element for illumination arranged in parallel with said first optical fiber element, a first reflecting element arranged in front of said objective for deflecting the light from said object, a second reflecting element arranged for deflecting the light from the object toward said first reflecting element, a third reflecting element arranged at the end portion on the object side of said second optical fiber element for the purpose of deflecting the illuminating light transmitted by said second optical fiber element, a fourth reflecting element arranged to further deflect the illuminating light deflected toward said object, a holding tube holding said image rotator and having cam groove, a cylindrical member having said second reflecting element and said fourth reflecting element, a first gear formed on said cylindrical member, a first case having a cylindrical hole for housing said holding tube, said objective and said first optical fiber element, said first case further having an annular portion for rotatably holding said cylindrical member and having a slot formed in parallel with the axis of said cylindrical hole, a second gear meshing with said first gear, a pulley arranged to rotate integrally with said second gear, a wire applied to said pulley, a pin fixed to an end of said wire and inserted into said cam groove through the slot, and a second case mounted to said first case and housing the end portion on the object side of said second optical fiber element, said third reflecting element being fixed to said second case, whereby said cylindrical member and said holding tube are rotated at the same time by operation of said wire.

13. An endoscope comprising a first optical fiber element for transmitting an image of an object, an objective arranged at one end of said first optical fiber element for forming the image of the object, a second optical fiber element for illumination arranged in parallel with said first optical fiber element, a first reflecting element arranged in front of said objective for deflecting the light from said object, a second reflecting element arranged for deflecting the light from the object toward said first reflecting element, a third reflecting element arranged at the end portion on the object side of said second optical fiber element for the purpose of deflecting the illuminating light transmitted by said second optical fiber element, a fourth reflecting element arranged to further deflect the illuminating light deflected toward said object, a first case having cylindrical hole for housing an end portion on the object side of said first optical fiber element and said objective, said first case further holding said first reflecting member, a cylindrical member for holding said second reflecting element and said fourth reflecting element, a supporting member having an annular portion for rotatably holding said cylindrical member, said supporting member being pivotably mounted in rightward and leftward direction to said first case, a wire applied to said cylindrical member for the purpose of rotating said cylindrical member, another wire having one end fixed to said supporting member for the purpose of rotating said supporting member in relation to said first case, and a second case holding the end portion on the object side of said second optical fiber element and at the same time holding said third reflecting element fixed to said second case.

* * * * *